United States Patent
Lee

(10) Patent No.: US 9,663,875 B2
(45) Date of Patent: May 30, 2017

(54) SHEETS AND FIBRIDS COMPRISING A MIXTURE OF POLY(M-PHENYLENE ISOPHTHALAMIDE) AND COPOLYMER MADE FROM 5(6)-AMINO-2-(P-AMINOPHENYL) BENZIMIDAZOLE

(71) Applicant: E I DU PONT DE NEMOURS AND COMPANY, Wilmington, DE (US)

(72) Inventor: Kiu-Seung Lee, Midlothian, VA (US)

(73) Assignee: EI DU PONT DE NEMOURS AND COMPANY, Wilmington, DE (US)

( * ) Notice: Subject to any disclaimer, the term of this patent is extended or adjusted under 35 U.S.C. 154(b) by 259 days.

(21) Appl. No.: 14/526,643

(22) Filed: Oct. 29, 2014

(65) Prior Publication Data

US 2015/0114582 A1 Apr. 30, 2015

Related U.S. Application Data

(60) Provisional application No. 61/897,608, filed on Oct. 30, 2013.

(51) Int. Cl.
*D21H 21/18* (2006.01)
*D21H 17/56* (2006.01)
(Continued)

(52) U.S. Cl.
CPC ............ *D01D 5/40* (2013.01); *C08G 69/32* (2013.01); *C08G 73/18* (2013.01); *C08L 77/10* (2013.01);
(Continued)

(58) Field of Classification Search
USPC ......... 162/141, 146, 148, 149, 157.1, 157.3, 162/164.6; 428/2
See application file for complete search history.

(56) References Cited

U.S. PATENT DOCUMENTS 2,988,785 A 6/1961 Guandique et al.
2,999,788 A 9/1961 Morgan
(Continued)

FOREIGN PATENT DOCUMENTS

GB 1381181 1/1975
JP 2010126826 A * 6/2010
(Continued)

OTHER PUBLICATIONS

Machine translation of JP 2010-126826 A, AIPN, Japan Patent Office, [online], 2016, retrieved from the Internet, [retrieved Sep. 1, 2016], <URL: https://dossier1.j-platpat.inpit.go.jp/tri/all/odse/ODSE_GM101_Top.action>.*
(Continued)

*Primary Examiner* — Dennis Cordray

(57) ABSTRACT

This invention relates to a sheet comprising fibers and fibrids wherein either comprises a mixture of at least a first polymer and a second polymer;

the first polymer derived from the reaction of one or more amine monomers and a plurality of acid monomers, wherein the one or more amine monomers includes at least 60 mole percent 5(6)-amino-2-(p-aminophenyl) benzimidazole, based on the total amount of amine monomers; and the plurality of acid monomers include those having a structure of

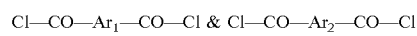

Cl—CO—Ar$_1$—CO—Cl & Cl—CO—Ar$_2$—CO—Cl wherein Ar$_1$ is an aromatic group having para-oriented linkages and Ar$_2$ is an aromatic group having meta-oriented linkages, and wherein the plurality of acid monomers has at least 50 mole percent of the monomer containing aromatic group Ar$_2$; and the second polymer derived from the reaction of meta-phenylene diamine and isophthaloyl chloride.

12 Claims, 1 Drawing Sheet

(51) Int. Cl.
*D01F 6/60* (2006.01)
*D01F 6/74* (2006.01)
*D01F 6/80* (2006.01)
*D01D 5/40* (2006.01)
*D01F 6/90* (2006.01)
*C08G 69/32* (2006.01)
*C08G 73/18* (2006.01)
*C08L 77/10* (2006.01)
*C08L 79/04* (2006.01)
*D21H 15/10* (2006.01)
*D21H 21/28* (2006.01)

(52) U.S. Cl.
CPC .............. *C08L 79/04* (2013.01); *D01F 6/905* (2013.01); *D21H 15/10* (2013.01); *D21H 21/28* (2013.01); *D01F 6/605* (2013.01); *D01F 6/74* (2013.01); *D01F 6/805* (2013.01); *Y10T 428/2982* (2015.01)

(56) References Cited

U.S. PATENT DOCUMENTS

| | | | |
|---|---|---|---|
| 3,018,091 A | 1/1962 | Duggins | |
| 3,069,366 A | 11/1962 | DuPont | |
| 3,227,793 A | 1/1966 | Cipriani | |
| 3,287,324 A | 11/1966 | Sweeny | |
| 3,354,127 A | 11/1967 | DuPont | |
| 3,414,645 A | 12/1968 | Morgan | |
| 3,511,819 A | 5/1970 | DuPont | |
| 3,756,908 A | 9/1973 | DuPont | |
| 3,767,756 A | 10/1973 | DuPont | |
| 3,869,429 A | 3/1975 | Blades | |
| 3,869,430 A | 3/1975 | Blades | |
| 4,668,234 A | 5/1987 | Vance et al. | |
| 4,755,335 A | 7/1988 | Ghorashi | |
| 4,883,496 A | 11/1989 | Ghorashi | |
| 5,026,456 A | 6/1991 | Hesler et al. | |
| 5,096,459 A | 3/1992 | Ghorashi | |
| 5,667,743 A | 9/1997 | Tai et al. | |
| 8,716,430 B2* | 5/2014 | Mallon | C08G 69/32 528/336 |
| 8,716,433 B2* | 5/2014 | Lee | C08G 69/32 528/336 |
| 8,716,434 B2* | 5/2014 | Lee | C08G 69/32 528/336 |
| 9,193,841 B2* | 11/2015 | Lee | C08J 5/18 |
| 2009/0159227 A1* | 6/2009 | Levit | D21H 13/10 162/146 |
| 2010/0029159 A1* | 2/2010 | Ishihara | C08G 69/32 442/301 |
| 2012/0001359 A1* | 1/2012 | Lorentz | D01F 6/905 264/115 |

FOREIGN PATENT DOCUMENTS

| | | |
|---|---|---|
| RU | 2180369 C2 | 3/2002 |
| RU | 2345988 C2 | 2/2009 |
| WO | 0077283 A2 | 12/2000 |

OTHER PUBLICATIONS

Volokhina et al, "Synthesis of New Aramid Fiber", Polymer Sci., Ser. A, vol. 52, No. 11, (2010), pp. 1239-1243.*
International Search Report, mailed Feb. 3, 2015, for International application No. PCT/US2014/062872, filed Oct. 29, 2014, International Searching Authority EPO.

* cited by examiner

SHEETS AND FIBRIDS COMPRISING A MIXTURE OF POLY(M-PHENYLENE ISOPHTHALAMIDE) AND COPOLYMER MADE FROM 5(6)-AMINO-2-(P-AMINOPHENYL) BENZIMIDAZOLE

BACKGROUND OF THE INVENTION

Field of the Invention

The invention concerns sheet structures, such as papers, comprising either floc or fibrids made from a mixture of at least two polymers, wherein at least one polymer comprises poly(meta-phenylene isophthalamide) (MPD-I) and the other polymer is a copolymer made from the diamine monomer 5(6)-amino-2-(p-aminophenyl)benzimidazole (DAPBI), and methods of making the same. The sheets have improved properties and have use in such things electrical insulation.

Papers containing aramid fiber and fibrids made from homopolymer solutions of MPD-I have been commercially sold under the name of Nomex® by E. I. du Pont de Nemours and Company. However, it has been found that by coagulating a polymer solution containing a homogeneous mixture of MPD-I with a copolymer having charge characteristics opposite to MPD-I, made from the monomer (DAPBI), a shaped article can be made that only accepts acid dyes. This characteristic is due to a surprising sheath-core-like structure formed from that homogeneous composite polymer solution during coagulation. Shaped articles in the form of fiber and/or fibrids, when used in sheets such as papers, are also believed to provide new coloration properties for those sheets.

Further, it is believed the faster coagulating MPD-I homopolymer forces the slower coagulating DAPBI-based copolymer to migrate to the surface of the shaped article during the shaping process. The shaped articles (and items containing the shaped articles) are believed to present the improved properties of the more expensive DAPBI copolymer while containing a significant amount of the less expensive MPD-I homopolymer. Specifically, the shaped articles are believed to have a dielectric strength similar to articles made solely with the DAPBI copolymer, which has a higher dielectric strength than MPD-I homopolymer, The shaped articles also have improved thermal stability reflective of the limiting oxygen index (L.O.I.) of 45 for DAPBI, versus the lower L.O.I. of about 30 for MPD-I.

SUMMARY OF THE INVENTION

This invention relates to a sheet structure comprising fibers and fibrids, the fibrids bonding individual fibers together to provide wet and/or dry strength to the sheet, wherein either the fibers and/or the fibrids comprise(s) a mixture of at least a first polymer and a second polymer;

the first polymer having a structure derived from the reaction of one or more amine monomers and a plurality of acid monomers, wherein
  i) the one or more amine monomers includes at least 60 mole percent 5(6)-amino-2-(p-aminophenyl)benzimidazole, based on the total amount of amine monomers; and
  ii) the plurality of acid monomers include those having a structure of

wherein $Ar_1$ is an aromatic group having para-oriented linkages and $Ar_2$ is an aromatic group having meta-oriented linkages, and wherein the plurality of acid monomers has at least 50 mole percent of the monomer containing aromatic group $Ar_2$; and the second polymer having a structure derived from the reaction of metaphenylene diamine and isophthaloyl chloride.

This invention also relates to fibrids comprising the same mixture described above of at least a first and second polymer.

DETAILED DESCRIPTION

Figure 1:
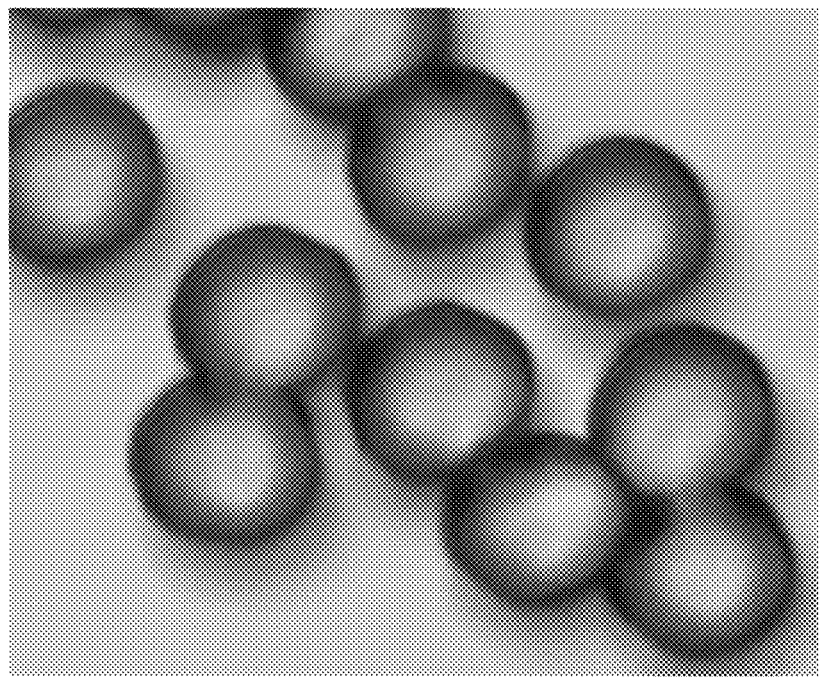
FIG. 1 is a photographic representation of dyed filament cross-section having a composition, by weight, of 50% first polymer and 50% second polymer, as spun through standard round spinneret holes.

The invention concerns a sheet structure, such as a paper, that comprises fibers and fibrids, the fibers acting as a binder used for bonding the individual fibers together to provide wet and/or dry strength to the sheet. The shaped articles used in the sheets, namely the fibers and/or fibrids, comprise a mixture of at least a first polymer and a second polymer. The first polymer preferably is dyeable with acid dyes while the second polymer preferably is dyeable with basic dyes.

The first polymer has a structure derived from the reaction of one or more amine monomers and a plurality of acid monomers, wherein the one or more amine monomers includes at least 60 mole percent 5(6)-amino-2-(p-aminophenyl)benzimidazole (DAPBI), based on the total amount of amine monomers. One preferred first polymer is made substantially from 60 to 80 mole percent DAPBI diamine monomer. In some other embodiments, the one or more amine monomers is 100 mole percent 5(6)-amino-2-(p-aminophenyl)benzimidazole (DAPBI). In some embodiments, the one or more amine monomers include metaphenylene diamine (MPD) in addition to the DAPBI. In some embodiments, the DAPBI is combined with 20 to 40 mole percent MPD amine monomer, with 60/40 DAPBI/MPD being a most preferred combination.

The one or more amine monomers are copolymerized with a plurality of acid monomers in a compatible solvent to create a copolymer. The plurality of acid monomers includes those having a structure of

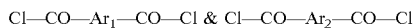

wherein $Ar_1$ is an aromatic group having para-oriented linkages and $Ar_2$ is an aromatic group having meta-oriented linkages. The plurality of acid monomers has at least 50 mole percent of the monomer containing aromatic group $Ar_2$.

$Ar_1$ and $Ar_2$ can be any unsubstituted or substituted aromatic ring structures but are preferably benzene groups. A preferred acid monomer containing aromatic group $Ar_2$ is isophthaloyl dichloride and a preferred aromatic group containing $Ar_1$ is terephthaloyl dichloride. In some embodiments, the plurality of acid monomers has 60 to 80 mole percent of the monomer containing aromatic group $Ar_2$ having meta-oriented linkages and 20 to 40 mole percent of the monomer containing the aromatic group $Ar_1$ having para-oriented linkages.

Useful general techniques for making the monomer 5(6)-amino-2-(p-aminophenyl)benzimidazole (DAPBI) and the first polymer include those disclosed in, for example, Russian Federation Pat. Nos. 2,345,988 to Vulakh et al. and 2,180,369 to Machalaba et al.; Great British Pat. No. 1,381,181 to Kudryavtsev et al.; and U.S. Pat. No. 3,511,819 to Bleasdale and U.S. Pat. No. 3,354,127 to Hill et al.

In some embodiments, the first polymer can be dyed with one or more acidic dyes; that is, the polymer accepts and can be colored by a dye having a negative-charge-seeking positive (or electron-deficient) center.

The second polymer has a structure derived from the reaction of metaphenylene diamine and isophthaloyl chloride. The preferred second polymer is poly(metaphenylene isophthamide) in the form of a polyamide homopolymer. As an aramid, it has at least 85% of the amide (—CONH—) linkages attached directly to two aromatic rings. The rings can be unsubstituted or substituted. The preferred second polymer is a meta-aramid, wherein the two rings or radicals are meta-oriented with respect to each other along the molecular chain. Preferably, the second polymer derived from the reaction of metaphenylene diamine and isophthaloyl chloride has no more than 10 percent of other diamines substituted for a primary metaphenylene diamine used in forming the polymer or no more than 10 percent of other diacid chlorides substituted for a primary isophthaloyl chloride used in forming the polymer.

Useful general techniques for making the second polymer, and specifically poly(meta-phenylene isophthalamide) (MPD-I), include those disclosed in, for example, U.S. Pat. Nos. 3,063,966; 3,227,793; 3,287,324; 3,414,645; and 5,667,743.

In some embodiments, the second polymer can be dyed with one or more basic dyes; that is, the polymer accepts and can be colored by a dye having a positive-charge-seeking negative (or electron-rich) center.

The homogeneous mixture of at least a first polymer and a second polymer used to make the shaped articles preferably contains 25 to 80 weight percent of the first polymer, based on the total amount of first polymer and second polymer. When the shaped article contains only the first polymer and the second polymer, the shaped article preferably contains 25 to 80 weight percent of the first polymer and 20 to 75 weight percent of the second polymer.

In some embodiments, the homogeneous mixture of at least a first polymer and a second polymer used to make the shaped article preferably contains 25 to 50 weight percent of the first polymer, based on the total amount of first polymer and second polymer.

While other polymers or copolymers can be mixed in with the mixture of the first and second polymers, in a preferred embodiment the mixture contains only the first copolymer combined with the second homopolymer.

The at least a first polymer and second polymer can preferably be independently made via polycondensation of one or more types of diamine monomer with one or more types of chloride monomers in a dialkyl amide solvent such as N-methyl pyrrolidone, dimethyl acetamide, or mixtures thereof. In some embodiments the preferred solvent is dimethyl acetamide. In some embodiments of the polymerizations of this type an inorganic salt such as lithium chloride or calcium chloride is also present. If desired the polymer can be isolated by precipitation with non-solvent such as water, neutralized, washed, and dried. The polymer can also be made via interfacial polymerization that produces polymer powder directly that can then be dissolved in a solvent for fiber production.

Fiber is spun from a homogeneous mixture of at least a first polymer and second polymer in a solution. A solution suitable for spinning fibers containing the homogeneous mixture can be achieved by a number of ways. These include polymerizing the first polymer in a solvent and isolating that first polymer as a solid, and then polymerizing separately the second polymer in a solvent and isolating that second polymer as a solid. The two solids are then mixed to form a mixture of solids and dissolved in a suitable solvent in amount that forms a homogeneous solution of the polymers suitable for spinning fibers. Alternatively, the first polymer can be polymerized in a solvent to form a first polymer solution and the second polymer can be polymerized in a solvent to form a second polymer solution. The two solutions can then be mixed to form a homogeneous solution of polymers suitable for spinning fibers. Other combinations of these methods are possible, as is other possible methods of forming a solution that is suitable for spinning fibers that contains a homogeneous mixture of at least the first polymer and second polymer.

Fiber spinning can be accomplished through a multi-hole spinneret by wet spinning, dry spinning, or dry-jet wet spinning (also known as air-gap spinning) to create a multi-filament yarn or tow as is known in the art. The fibers in the multi-filament yarn or tow after spinning can then be treated to neutralize, wash, dry, or heat treat the fibers as needed using conventional techniques to make stable and useful fibers. Exemplary dry, wet, and dry-jet wet spinning processes are disclosed U.S. Pat. Nos. 3,063,966; 3,227,793; 3,287,324; 3,414,645; 3,869,430; 3,869,429; 3,767,756; and 5,667,743.

It has been found that when the homogeneous solution of the mixture of polymers described herein is spun through a spinneret having regular holes or capillaries comprised of single holes, the filaments that are formed have a surprising sheath-core-like structure. Surprisingly, this structure is believed to be formed during coagulation of the dope filaments and does not require special sheath-core designed spinneret holes or capillaries. In other words, the inventor has found that the fiber, when spun from a single homogeneous solution containing a mixture of polymers, has differing amounts of those polymers distributed radially in that fiber.

For purposes herein, the term "fiber" is defined as a relatively flexible, macroscopically homogeneous body having a high ratio of length to the width of the cross-sectional area perpendicular to that length. The fiber cross section can be any shape, but is typically round. Preferably the fibers are generally solid without macroscopic voids or holes or annular open regions. Herein, the term "filament" or "continuous filament" is used interchangeably with the term "fiber."

Figure 2:
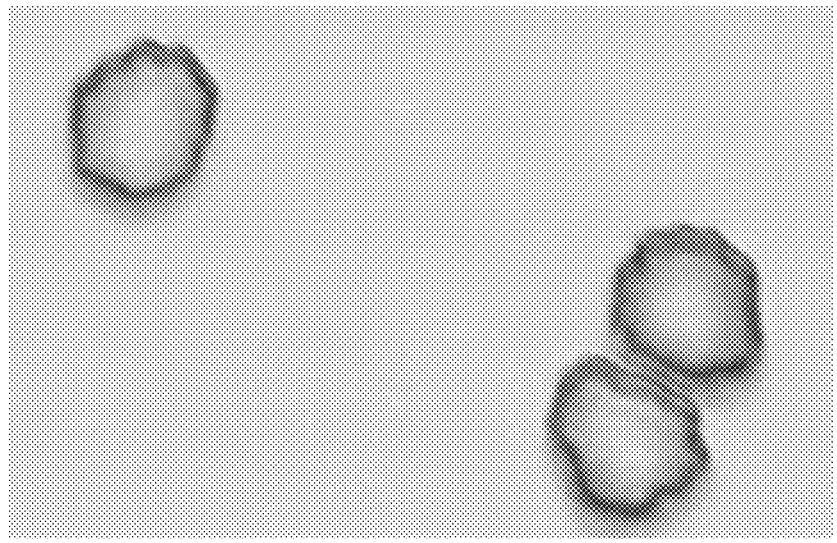
FIG. 2 is a photographic representation of dyed filament cross-section having a composition, by weight, of 35% first polymer and 65% second polymer, as spun through standard round spinneret holes.

A cross-section of the coagulated fiber reveals the fiber has a first polymer-rich zone for the sheath, a second polymer-rich zone for the core, and a transition zone having a combination of the first and second polymers. The thickness of the first polymer-rich zone sheath and the second polymer-rich zone is determined by the relative amounts of first polymer and the second polymer in the homogeneous solution. The surprising sheath-core structure is illustrated in FIG. 1 and FIG. 2. FIG. 1 is a photographic representation of coagulated filaments made from a homogeneous mixture of 50 weight percent MPD-I polymer and 50 weight percent DABPI-I/T (60/40 mole %) copolymer that has in turn been dyed with acidic dye. The figures reveal the resulting fiber has three zones. The first is a MPD-I rich zone at the center or core of the filaments that is uncolored or undyed by the acidic dye. The second is a DAPBI-I/T rich zone that forms the outer sheath and that is significantly dyed a dark shade, representative of the ability to color or dye that copolymer with acid dyes. Between the uncolored core and the colored sheath is a partially colored or dyed transition zone that contains a mixture of the two polymers. It is believed the figures confirm there is a gradient between the MPD-I rich core to the DAPBI-I/T rich sheath, with the transition zone having a mixture of DAPBI-I/T & MPD-I, wherein in the transition zone the mixture has a higher weight percentage of the MPD-I polymer nearer the core and a higher weight percentage of the DAPBI-/I/T copolymer nearer the sheath. FIG. 2 is a photographic representation of cross-sections similarly dyed filaments made from same first and second polymers; however these polymers are made from a mixture of 65 weight percentage MPD-I and 35 weight percentage DAPBI-I/T (60/40 mole %). The resultant fibers have a larger core zone and a smaller sheath zone due to the relative increase in the amount of core polymer versus the sheath polymer.

Although not to be bound by theory, it is believed this surprising sheath-core structure is the result of differing rates of solvent removal from the individual polymers in the mixture during coagulation and/or quenching. Coagulation rate of the MPD-I polymer is believed to be significantly higher than the coagulation rate of either the DAPBI-I/T copolymer or DAPBI/MPD-I/T copolymer, meaning the core material (MPD-I) coagulates first, pushing the slower coagulating copolymer (DAPBI-I/T or DAPBI/MPD-I/T) to the filament surface. It is believed the preferred process is to conduct this multi-stage coagulation using wet spinning, where the combination of preferred coagulant (water) and residence time in the coagulation bath is sufficient to allow the slower coagulating and more mobile copolymer to be forced to the surface of the filament during coagulation. However, it is believed that any fiber spinning arrangement could be used, assuming a suitable coagulation system, involving a suitable coagulant and suitable residence time was used.

Further, it is believed that the same coagulation theory also applies to fibrids made by fibridation, and that fibrids formed from the homogeneous mixture have the same three zones, namely a MPD-I rich zone at the fibrid center that is uncolored or undyed by the acidic dye; a DAPBI-I/T rich zone that forms the outer fibrid shell and that is significantly dyed a dark shade, representative of the ability to color or dye that copolymer with acid dyes; and between the center and the shell is a transition zone having a mixture of DAPBI-I/T & MPD-I. Further it is believed in the transition zone the mixture has a higher weight percentage of the MPD-I polymer nearer the center and a higher weight percentage of the DAPBI-/I/T copolymer nearer the shell.

The filaments can be collected as continuous filament fibers and multifilament yarns of continuous filaments by processes well known to those skilled in the art. For example, multifilament continuous filament yarns can be made by winding filament thread lines directly on a bobbin, with or without twist; or if needed, combining multiple filament thread lines to form higher denier yarns.

For use in some sheet structures, the filaments can be converted into fibers known commonly as floc. By "floc" is meant a fiber having a length of 2 to 25 millimeters, preferably 3 to 7 millimeters and a diameter of 3 to 20 micrometers, preferably 5 to 14 micrometers. If the floc length is less than 3 millimeters, it is believed it will not provide adequate final sheet structure strength and if it is more than 25 millimeters, it is difficult to form a uniform web by a wet-laid method. If the floc diameter is less than 5 micrometers, it can be difficult to produce it with enough uniformity and reproducibility and if it is more than 20 micrometers, it is very difficult to form uniform paper of light to medium basis weights. Floc is generally made by cutting continuous spun filaments into specific-length pieces.

Alternatively, the homogeneous mixture of the first polymer and second polymer can be used to make fibrids. The term "fibrids" as used herein, means a very finely-divided polymer product of small, filmy, essentially two-dimensional particles having a length and width on the order of 100 to 1000 micrometers and a thickness only on the order of 0.1 to 1 micrometer.

Fibrids are not fibers, but they are fibrous in that they have fiber-like regions connected by webs. Some fibrids have an aspect ratio of 5:1 to 10:1. Undried fibrids can be used wet and can be deposited as a binder physically entwined about the floc in the sheet structure. "Aspect ratio" means the maximum dimension of the fibrid, divided by the maximum width of that fibrid in any plane containing the maximum dimension where the maximum width is perpendicular to the maximum dimension.

Fibrids are typically made by streaming a polymer solution into a coagulating bath of liquid that is immiscible with the solvent of the solution. The stream of polymer solution is subjected to strenuous shearing forces and turbulence as the polymer is coagulated. Fibrids can be prepared by precipitating and shearing a polymer solution in a single step using for example the methods and devices such as those disclosed in U.S. Pat. Nos. 2,988,782; 2,999,788; & 3,018,091. The Canadian Standard Freeness (CSF) of fibrids made in this manner ranges from about 180 to greater than 800.

The sheet structure can be formed by dry-laid or wet-laid methods. In some preferred embodiments, the wet-laid method is used to form a paper on equipment of any scale from laboratory screens to commercial-sized papermaking machinery, such as Fourdrinier, cylinder machines, or inclined wire machines. The general process involves making a dispersion of fibrids, floc and other possible ingredients in an aqueous liquid, draining the liquid from the dispersion to yield a wet composition and drying the wet paper composition. The dispersion can be made either by dispersing the floc and then adding the fibrids or by dispersing the fibrids and then adding the floc. The dispersion can also be made by combining a dispersion of floc with a dispersion of fibrids. The concentration of floc in the dispersion can range from 0.01 to 1.0 weight percent based on the total weight of the dispersion. The concentration of the fibrids in the dispersion can be up to 90 weight percent based on the total weight of solids. Additional ingredients for the adjustment of properties, etc., in powder or fibrous form, can be added to the composition.

The aqueous liquid of the dispersion is generally water, but may include various other materials such as pH-adjusting materials, forming aids, surfactants, defoamers and the like. The aqueous liquid is usually drained from the dispersion by conducting the dispersion onto a screen or other perforated support, retaining the dispersed solids and passing the liquid to yield a wet paper composition. The wet paper composition, once formed on the support, is usually further dewatered by vacuum or other pressure forces and further dried by evaporating the remaining liquid to form a sheet structure.

For some embodiments, reference may be made to Gross, (U.S. Pat. No. 3,756,908) and Hesler et al. (U.S. Pat. No. 5,026,456) for illustrative processes for forming sheet structures including papers. If desired, once the paper is formed it is calendered between two heated calendering rolls with the high temperature and pressure from the rolls increasing the bond strength of the paper. Several plies with the same or different compositions can be combined together into the final paper structure during forming and/or calendering. In one embodiment, the paper has a weight ratio of fibrids to floc in the paper composition of from 95:5 to 10:90. In one preferred embodiment, the paper has a weight ratio of fibrids to floc in the paper composition of from 60:40 to 10:90. In some preferred embodiments, the sheet structures contain at least 10 weight percent fibrids, with the remainder generally being floc. In some embodiments the thickness of the sheet structure is typically from 1 to 5 mils. In some embodiments, the basis weight of the sheet structure is from 0.5 to 6 ounces per square yard.

In some particularly useful embodiments, the sheet structures including papers and the fibrids are useful as a part of electrical insulation systems for different electrical devices including motors, generators, and transformers, and, also, for different structural composites including cores and face sheets for sandwich panels. In these applications, the sheet structures or papers can be used either with or without impregnating resins, as desired. Multiple layers of the sheet structures or papers can be laminated or bonded together to create thicker papers or board, such as those known as pressboard.

The floc and/or fibrids can be colored using such methods as those disclosed in, for example, U.S. Pat. Nos. 4,668,234; 4,755,335; 4,883,496; and 5,096,459, and can be used to make colored sheet structures including paper. It is believed the floc and/or fibrids can be colored prior to being used in a sheet structure. Alternatively, the floc and/or fibrids can be made into a sheet structure, and this sheet structure can then be dyed. A dye assist agent, also known as a dye carrier, may be used to help increase dye pick up by the floc and/or fibrids. By dyeing the floc and/or fibrids with the use of a dye carrier the crystallinity of the fibers may be increased. Useful dye carriers include aryl ether, benzyl alcohol, or acetophenone.

Test Methods

Dyeing Procedure. Make up the dye module with 300 ml of de-ionized water, 50 ml of benzyl alcohol (carrier) and 0.2180 grams of sample and close the cap tight. Place the dye module in heating chamber of the dyeing machine Ahiba Polymat by Data Color Type PM 80086. Set the temperature at 70° C., and run for 10 minutes. Take out the dye module from the machine, and add 2 weight percent dye, based on the weight of the sample, and dissolve in the solution. Place the dye module back in the dyeing machine and set the temperature at 130° C. and run for one hour. Cool the dye bath to room temperature and open the machine. Remove the module from the machine and open. Take out the sample and rinse with de-ionized water several times. Scour the sample with detergent thoroughly and squeeze out the excess water. Dry the sample in an oven at 120° C. overnight.

Canadian Standard Freeness (CSF) of the fibrids is a measure of the rate, at which a dilute suspension of fibrids may be drained, and was determined in accordance with TAPPI Test Method T 227.

EXAMPLES

The invention is illustrated by, but is not intended to be limited by the following examples. Unless otherwise stated, the relative amount of polymer and copolymer provided in a mixture is represented in weight percent, based on the total amount of the polymer and copolymer mixed together, and the relative amount of amine or acid monomers used in the copolymers is provided in mole percent based on the total amount of that type of monomer (amine or acid monomer) in the copolymer.

Example 1

Preparation of MPD-I Homopolymer

A polymer solution having a MPD-I polymer concentration of 19.3% by weight was made in the following manner. 214.2 grams of DMAc and 18.168 grams (0.168 moles) of 1,3-phenylenediamine (MPD) were added to a 1-liter reaction kettle, equipped with a basket stirrer and a nitrogen inlet/outlet. The contents were stirred under a nitrogen blanket at room temperature until solid particles of MPD were completely dissolved. The kettle was then placed in an ice-water bath and while stirring, the contents were cooled to ~10° C. The kettle was removed from the ice-water bath. 38.098 grams (0.168 moles) of isophthaloyl dichloride (ICI) was added to the reaction mixture in the kettle all at once. The solution slowly became viscous and thicker with time. When the solution viscosity reached the plateau (after one hour or so), 12.447 grams (0.168 moles) of calcium hydroxide ($Ca(OH)_2$) that had been slurried with an equal amount of DMAc, was added to the solution and then stirred vigorously until all solid particles of $Ca(OH)_2$ disappeared. Stirring was continued for an additional one hour to complete the neutralization. The reaction kettle was disassembled and placed in a vacuum oven and heated to 70° C. to evaporate additional DMAc and water until the total polymer solution weight was 207.2 grams.

Example 2

Preparation of DAPBI/MPD (80/20)-I/T(70/30) Copolymer 211.0 grams of DMAc and 8.427 grams of $CaCl_2$ were added to a 1 liter reaction kettle, equipped with a basket stirrer and a nitrogen inlet/outlet, and then heated to 70° C. to completely dissolve the $CaCl_2$. 13.364 grams (0.060 moles) of DAPBI [2-(p-aminophenyl)-5-aminobenzimidazole] was added to the hot solution and stirred until DAPBI was completely dissolved. The solution was then cooled to room temperature (25° C.) with stirring. 10.889 grams (0.054 moles) of ICI (isophthaloyl chloride) was then added, all at once, and stirred for 30 minutes. 1.765 grams (0.016 moles) of MPD (m-phenylene diamine) was then added and stirred until all MPD was dissolved. Then, 4.562 grams (0.022 moles) of TCI (terephthaloyl chloride) was added all at once and stirred for 60 minutes. The solution got more and more viscose with time, and the solution temperature rose to 55° C., and further increase was controlled by slowing down the stirrer. The resultant polymer concentration in the solution was 10% (w/w) and the $CaCl_2$/amine molar ratio was 1.000. To determine inherent viscosity, a small portion of the solution was isolated in the water and washed several times and dried in a 120° C. vacuum oven. The inherent viscosity measured in sulfuric acid (0.5 g/1 dl) was 2.65 dl/g.

Example 3

Preparation of DAPBI-T/I (40/60) Copolymer 372.4 grams of DMAc and 14.10 grams of $CaCl_2$ were added to a1 liter reaction kettle, equipped with a basket stirrer and a nitrogen inlet/outlet, and then heated to 70° C.

to completely dissolve the $CaCl_2$. 15.825 grams (0.071 moles) of DAPBI was added to the hot solution and stirred until the DAPBI is dissolved. The solution was cooled to room temperature (25° C.) with stirring. Then 5.730 grams (0.028 moles) of TCI was added all at once and stirred for 30 minutes, followed by addition of 8.617 grams (0.042 moles) of ICI. The reaction mixture was then stirred for 60 minutes. The solution got more and more viscose with time, and the solution temperature rose to 55° C., and further increase was controlled by slowing down the stirrer. The resultant polymer concentration in the solution was 6% (w/w) and the $CaCl_2$/amine molar ratio was 1.800. To determine inherent viscosity, a small portion of the solution was isolated in the water and washed several times and then dried in a 120° C. vacuum oven. The inherent viscosity measured in sulfuric acid (0.5 g/1 dl) was 5.09 dl/g.

Example 4

Preparation of a 78/22 Weight Percent Polymer Mixture of DAPBI/MPD (80/20)-I/T (70/30) Copolymer and MPD-I Homopolymer 80 grams of the DAPBI/MPD (80/20)-I/T(70/30) copolymer solution (8 g of polymer) of Example 2 was added to a reaction kettle equipped with disc stirrer and nitrogen inlet/outlet. 150 grams of the MPD-I homopolymer solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Example 5

Preparation of a 20/80 Weight Percent Polymer Mixture of DAPBI-I/T (60/40) Copolymer and MPD-I Homopolymer 120 grams of the DAPBI-I/T (60/40) copolymer solution (7.24 g of polymer) of Example 3 was added to a reaction kettle equipped with disc stirrer and nitrogen inlet/outlet. 150 grams of the MPD-I homopolymer solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Example 6

Preparation of a 50/50 Weight Percent Polymer Mixture of DAPBI-I/T (60/40) Copolymer and MPD-I Homopolymer 475 grams of the DAPBI-I/T(60/40) copolymer solution (28.95 grams of polymer) of Example 3 was added to a reaction kettle equipped with disc stirrer and nitrogen inlet/outlet. 150 grams of the MPD-I solution (28.95 g of polymer) of Example 1 was added and stirred for one hour at high speed. The solution temperature was controlled below 55° C. The mixture solution was placed in vacuum oven at room temperature overnight to remove bubbles generated during the mixing. The resultant solution was transparent and clear showing that the blend was compatible and was capable of being spun into fibers.

Comparison Example A

Preparation of Incompatible 22/78 Weight Percent Polymer Mixture of DAPBI/MPD (50/50)-I/T (25/75) Copolymer and MPD-I Homopolymer A DAPBI/MPD (50/50)-I/T(25/75) copolymer was made as follows. 297.1 grams of DMAc and 11.242 grams of $CaCl_2$ were added to al liter reaction kettle, equipped with a basket stirrer and a nitrogen inlet/outlet, and then heated to 70° C. to completely dissolve the $CaCl_2$. 7.571 grams (0.034 moles) of DAPBI was added to the hot solution and stirred until the DAPBI was completely dissolved. To this solution, 3.651 grams (0.034 moles) of MPD was added and dissolved. The solution was cooled to room temperature (25° C.) with stirring. Then, 10.306 grams (0.054 moles) of TCI was added all at once and stirred for 5 minutes and then 3.435 grams (0.017 moles) of ICI was added and stirred for 60 minutes. The solution got more and more viscose with time, and the solution temperature rose to 55° C., and further increase was controlled by slowing down the stirrer. The resultant polymer concentration in the solution was 6% (w/w) and the $CaCl_2$/amine molar ratio was 1.500. To determine inherent viscosity, a small portion of the solution was isolated in the water and washed several times and then dried in a 120° C. vacuum oven. The inherent viscosity measured in sulfuric acid (0.5 g/1 dl) was 3 dl/g.

133 grams of the DAPBI/MPD (50/50)-I/T (25/75) copolymer solution (8 grams of polymer) was added to a reaction kettle equipped with disc stirrer and nitrogen inlet/outlet. 150 grams of the MPD-I solution (28.95 grams of polymer) was added and stirred for one hour at high speed. The % copolymer was 21.6% (w/w) in the blend. The solution temperature was controlled below 55° C. The mixture solution was placed in vacuum oven at room temperature overnight to remove bubbles generated during the mixing. The resultant solution separated into two phases—one clear top layer and an opaque bottom layer, meaning this solution could not be spun into fibers.

Comparison Example B

Preparation of Incompatible 22/78 Weight Percent Polymer Mixture of DAPBI/MPD (40/60)-T Copolymer and MPD-I Homopolymer 375.5 grams of DMAc and 9.750 g of $CaCl_2$ were added to al liter reaction kettle equipped with a basket stirrer and a nitrogen inlet/outlet and then heated to 70° C. to completely dissolve the $CaCl_2$. 7.880 grams (0.035 moles) of DAPBI was added to the hot solution and stirred until the DAPBI was completely dissolved. To this solution, 5.699 grams (0.053 moles) of MPD was added and dissolved. The solution was cooled to room temperature (25° C.) with stirring. 17.177 grams (0.085 moles) of TCI was then added all at once and stirred for 60 minutes. The solution got more and more viscose with time, and the solution temperature rose to 55° C., and further increase was controlled by slowing down the stirrer. The resultant polymer concentration in the solution was 6% (w/w) and the $CaCl_2$/amine molar ratio was 1.000. To determine inherent viscosity, a small portion of the solution was isolated in the water and washed several times and dried in 120° C. vacuum oven. The inherent viscosity measured in sulfuric acid (0.5 g/1 dl) was 2.89 dl/g.

133 grams of the DAPBI/MPD (40/60)-T copolymer solution (8 grams of polymer) was added to a reaction kettle equipped with disc stirrer and nitrogen inlet/outlet. 150 grams of the MPD-I solution (28.95 grams of polymer) was added and stirred for one hour at high speed. The % copolymer was 21.6% (w/w) in the blend. The solution temperature was controlled below 55° C. The mixture solution was placed in vacuum oven at room temperature overnight to remove bubbles generated during the mixing. The resultant solution exhibited micro-phase separation. The solution looked opaque with a syrupy cottage-cheese appearance. This solution could not be spun into fibers.

Example 7

Preparation of Fibers from 78/22 Weight Percent Polymer Mixture of DAPBI/MPD (80/20)-I/T(70/30) Copolymer and MPD-I Homopolymer The clear 78/22 polymer mixture of DAPBI/MPD (80/20)-I/T(70/30) Copolymer and MPD-I Homopolymer of Example 4 was charged into the metal syringe very carefully to prevent entrapment of air bubbles. The syringe filled was placed onto the syringe wet-spinning unit and the room-temperature polymer mixture was pumped out of the syringe through a 136-hole spinneret having 2.5 mil diameter capillaries. Once the system was completely filled with the solution and full flow established from the spinneret, the spinneret was immersed beneath the surface of a water coagulation bath maintained at room temperature. The wet-spun extruded filaments passed through the coagulation bath at 5 yards per minute and were wound up on a perforated metal bobbin. Filament linear density was approximately 2 to 3 denier per filament. The resulting bobbin was then placed in de-ionized water to extract the solvent, and the water was changed several times to insure good removal of the solvent. The filaments were dried in a hot tube at 250° C. and collected on a bobbin.

Example 8

Preparation of Fibers from 20/80 Weight Percent Polymer Mixture of DAPBI-I/T (60/40) Copolymer and MPD-I Homopolymer Dried filaments on a bobbin were made as in Example 7 using the 20/80 Polymer Mixture of DAPBI-I/T (60/40) Copolymer and the MPD-I homopolymer of Example 5.

Example 9

Preparation of Fibers from 50/50 Weight Percent Polymer Mixture of DAPBI-I/T(60/40) Copolymer and MPD-I Homopolymer Dried filaments on a bobbin were made as in Example 7 using the 50/50 Polymer Mixture of DAPBI-I/T (60/40) Copolymer and MPD-I homopolymer of Example 6.

Example 10

Dyeability of Filaments Made from Polymer Mixture

Samples of fiber from the bobbins of filaments made in Examples 8, 9, and 10 were tested for dyeability per the Dyeing Procedure test method and physical properties. All fiber samples were found to be dyeable with acidic dyes and have fiber tenacities in the ranges of from 2-4 grams per denier, depending upon the polymer composition.

Example 11

Effect of Acid and Basic Dyes

To further examine the effect of dye type, the fiber spinning process of Example 7 was used to spin a first control fiber utilizing 100% of the DAPBI-T/I (40/60) Copolymer of Example 3. A second control fiber was also made using the fiber spinning process of Example 7, utilizing 100% of the MPD-I homopolymer of Example 1.

In addition, following the procedures of Example 5 and 6, a 35%/65% polymer mixture of the DAPBI-T/I (40/60) Copolymer of Example 3 and the MPD-I homopolymer of Example 1 was made, and fiber was spun from that Polymer mixture using the process of Example 7.

These three fibers, along with the fiber from the 50/50 polymer mixture of DAPBI-I/T (60/40) copolymer and MPD-I homopolymer of Examples 9 were then dyed with acidic and basic dyes per the Dyeing Procedure test method. Both the acidic and basic dyes were red dyes.

Results are shown for the various compositions in Table. The two control fibers showed the natural characteristic of the 100% polymer. Fiber of 100% DAPBI-I/T readily accepts acidic dye and was dyed a red color. Basic dyes did not dye the fiber red. Fiber of 100% MPD-I was only slightly dyeable with red basic dyes, illustrating the general challenge with dyeing the homopolymer. The MPD-I fiber was even less dyeable with acidic dyes, being very slightly tinted. Fibers made from the mixture of these polymers demonstrate surprising dyeability—the DAPBI-I/T dyeability—due to the unexpected position of the DAPBI-I/T polymer on the outer surface of the fiber.

TABLE

| DAPBI-I/T wt % | MPD-I wt % | Color After Acidic Dyeing | Color After Basic Dyeing |
|---|---|---|---|
| 100 | 0 | Dark Red | Yellow |
| 50 | 50 | Dark Red | Beige |
| 35 | 65 | Dark Red | Beige |
| 0 | 100 | Tinted | Dark Pink |

Comparison Example C

Fiber from Polyacrylonitrile Homopolymer/MPD-I Blend Solution

Using reaction equipment as in the prior examples, 20 grams of polyacrylonitrile homopolymer was dissolved in 80 grams of DMAc at room temperature by stirring with basket stirrer under nitrogen at room temperature in the reaction kettle. The polymer was completely dissolved in the solvent, making a transparent/clear solution.

296 grams of the 19.3% MPD-I solution in DMAc/CaCl2 from Example 1 was added to the polyacrylonitrile homopolymer solution prepared above and mixed for one hour in high shear. The blend solution was placed in 50° C. vacuum oven overnight to degas it. This solution was used for wet-spinning using the same procedure described in Example 7. The fiber was washed and dried the same way as Example 7.

The resulting fiber was placed in dyeing machine and dyed with basic dyes using the same Dyeing Procedure test method. As a control, 100% MPD-I fiber was also dyed with basic dyes using the same Dyeing Procedure test method. The fiber made from the blend of polyacrylonitrile homopolymer/MPD-I was colored or dyed as well as 100% MPD-I fiber. This indicates sheath/core separation of the polymer components in the polyacrylonitrile homopolymer/MPD-I blend did not occur, because polyacrylonitrile homopolymer by itself is not dyeable with basic dyes. If a sheath/core fiber had been formed with polyacrylonitrile homopolymer in the sheath, it should not have been dyeable. Subsequent testing showed that like DAPBI-I/T copolymers, the coagulation rate of acrylonitrile homopolymer in room temperature water is slower than the coagulation rate of MPD-I; however, the polyacrylonitrile homopolymer/MPD-I polymer blend does not provide the desired a similar fiber.

Example 12

Preparation of Fibrids from 78/22 Polymer Mixture of DAPBI-I/T Copolymer and MPD-I Homopolymer Four samples of the 78/22 polymer mixture in solution of Example 4 are further diluted by the addition of DMAc to form four individual solutions containing 2, 4, 6, and 12 weight percent solids. The four solutions are then heated to 70° C. in hot-water bath for more than three hours. This provides proper solution viscosities for laboratory fibridation. A precipitant solution is prepared by adding 60 grams of DMAc into 240 grams of de-ionized water (1:4 weight ratio). The precipitant solution is then poured into a Waring® blender container. The polymer solution is added slowly into the precipitant solution while the blender is set at a steady-state/medium speed. The polymer solution stream is maintained less than 5 mm wide as it enters the blender. After two minutes of continuous stirring, the blender is stopped. Longer stirring flocculates the fibrid particles into undesirable species.

The entire content of the blender container is poured into a Buchner funnel with a size 54 filter and the liquid is removed. The filtered content is then washed several times with deionized water to completely remove the solvent (DMAc and $CaCl_2$) The resulting wet fibrids are transferred into plastic bag and are stored wet for the paper making process. The Canadian Standard Freeness (CSF) of fibrids made in this manner ranges from about 180 to greater than 800. The fibrids accept coloration from acid dyes.

Example 13

Preparation of Fibrids from 20/80 Polymer Mixture of DAPBI-I/T Copolymer and MPD-I Homopolymer Example 12 is repeated using the 20/80 polymer mixture in solution of Example 5. The Canadian Standard Freeness (CSF) of fibrids made in this manner ranges from about 180 to greater than 800. The fibrids accept coloration from acid dyes.

Example 14

Preparation of Fibrids from 50/50 Polymer Mixture of DAPBI-I/T Copolymer and MPD-I Homopolymer Example 12 is repeated using the 50/50 polymer mixture in solution of Example 6. The Canadian Standard Freeness (CSF) of fibrids made in this manner ranges from about 180 to greater than 800. The fibrids accept coloration from acid dyes.

Example 15

Preparation of Papers Using Fibrids from 78/22 Polymer Mixture of DAPBI-I/T Copolymer and MPD-I Homopolymer Four samples of papers composed of 50 weight percent MPD-I floc and 50 weight percent of the fibrids of Example 12 are made in the following manner.

For each paper sample, 2.5 grams of each of the wet fibrid samples of Example 12 and 2.5 grams of ¼" cut Nomex® fiber (floc) are dispersed in 2500 ml of deionized water and are added into a laboratory mixer (British pulp evaluation apparatus). The mixture is agitated for 2 minutes into a well-dispersed slurry.

The slurry is then poured, with 4 additional liters of water, into an approximately 21×21 cm "hand-sheet mold" and a wet-laid sheet is formed as water is drained by gravity. The sheet is then placed between two pieces of blotting paper, is hand couched with a rolling pin, and is dried in a hand-sheet dryer at 180° C. The dried sheet is calendered using a plate press at 300° C. (572° F.) and linear pressure of about 800 psi. The paper accepts coloration from acid dyes.

Example 16

Preparation of Papers Using Fibrids from 20/80 Polymer Mixture of DAPBI-I/T Copolymer and MPD-I Homopolymer Example 15 is repeated; however the fibrids are replaced with the fibrids of Example 13. The paper accepts coloration from acid dyes.

Example 17

Preparation of Papers Using Fibrids from 50/50 Polymer Mixture of DAPBI-I/T Copolymer and MPD-I Homopolymer Example 15 is repeated; however the fibrids are replaced with the fibrids of Example 14. The paper accepts coloration from acid dyes.

Example 18

Preparation of Papers Using Floc from 78/22 Polymer Mixture of DAPBI-I/T Copolymer and MPD-I Homopolymer A paper composed of 50 weight percent floc, made from the fiber of Example 7, and 50 weight percent of the MPD-I fibrids, made using the process of Example 12 but using MPD-I homopolymer, is made in the following manner. The fiber of Example 7 is cut to ¼" lengths to make floc and 2.5 grams of this floc along with 2.5 grams of wet MPD-I fibrids are dispersed in 2500 ml of deionized water and are added into a laboratory mixer (British pulp evaluation apparatus). The mixture is agitated for 2 minutes into a well-dispersed slurry.

The slurry is then poured, with 4 additional liters of water, into an approximately 21×21 cm "hand-sheet mold" and a wet-laid sheet is formed as water is drained by gravity. The sheet is then placed between two pieces of blotting paper, is hand couched with a rolling pin, and is dried in a hand-sheet dryer at 180° C. The dried sheet is calendered using a plate press at 300° C. (572° F.) and linear pressure of about 800 psi. The paper accepts coloration from acid dyes.

Example 19

Preparation of Papers Using Floc from 20/80 Polymer Mixture of DAPBI-I/T Copolymer and MPD-I Homopolymer Example 18 is repeated; however the floc is replaced by floc made from the fiber of Example 8. The paper accepts coloration from acid dyes.

Example 20

Preparation of Papers Using Floc from 50/50 Polymer Mixture of DAPBI-I/T Copolymer and MPD-I Homopolymer Example 18 is repeated; however the floc is replaced by floc made from the fiber of Example 9. The paper accepts coloration from acid dyes.

Example 21

Preparation of Papers Using Floc and Fibrids from 78/22 Polymer Mixture of DAPBI-I/T Copolymer and MPD-I Homopolymer Example 18 is repeated; however the fibrids are replaced by the fibrids of Example 12. The paper accepts coloration from acid dyes.

Example 22

Preparation of Papers Using Floc and Fibrids from 20/80 Polymer Mixture of DAPBI-I/T Copolymer and MPD-I Homopolymer Example 18 is repeated; however the fibrids are replaced by the fibrids of Example 13. The paper accepts coloration from acid dyes.

Example 23

Preparation of Papers Using Floc and Fibrids from 50/50 Polymer Mixture of DAPBI-I/T Copolymer and MPD-I Homopolymer Example 18 is repeated; however the fibrids are replaced by the fibrids of Example 14. The paper accepts coloration from acid dyes.

What is claimed:

1. A sheet comprising fibers and fibrids, the fibrids bonding individual fibers together to provide wet and/or dry strength to the sheet, wherein the fibers and/or the fibrids are formed from a polymer mixture of at least a first polymer and a second polymer;
    the first polymer having a structure derived from the reaction of one or more amine monomers and a plurality of acid monomers, wherein
        i) the one or more amine monomers includes at least 60 mole percent 5(6)-amino-2-(p-aminophenyl)benzimidazole, based on the total amount of amine monomers; and
        ii) the plurality of acid monomers include those having a structure of

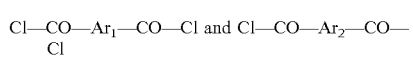

wherein $Ar_1$ is an aromatic group having para-oriented linkages and $Ar_2$ is an aromatic group having meta-oriented linkages, and wherein the plurality of acid monomers has at least 50 mole percent of the monomer containing aromatic group $Ar_2$; and
    the second polymer having a structure derived from the reaction of metaphenylene diamine and isophthaloyl chloride wherein no more than 10 percent of other diamines are substituted for metaphenylene diamine.

2. The sheet of claim 1, wherein the one or more amine monomers is 100 mole percent 5(6)-amino-2-(p-aminophenyl) benzimidazole.

3. The sheet of claim 1, wherein the one or more amine monomers include metaphenylene diamine.

4. The sheet of claim 1 comprising fibrids derived from wholly aromatic synthetic polymer.

5. The sheet of claim 4 wherein the wholly aromatic synthetic polymer is poly (metaphenylene isophthalamide).

6. The sheet of any one of claims 1 to 5, wherein the mixture of first polymer and second polymer contains 25 to 80 weight percent of the first polymer, based on the total amount of first polymer and second polymer.

7. The sheet of claim 6, wherein the mixture of first polymer and second polymer contains 25 to 50 weight percent of the first polymer, based on the total amount of first polymer and second polymer.

8. A fibrid having a length and width of 100 to 1000 micrometers and a thickness only on the order of 0.1 to 1 micrometer formed from a polymer mixture of at least a first polymer and a second polymer;
    the first polymer having a structure derived from the reaction of one or more amine monomers and a plurality of acid monomers, wherein
        i) the one or more amine monomers includes at least 60 mole percent 5(6)-amino-2-(p-aminophenyl)benzimidazole, based on the total amount of amine monomers; and
        ii) the plurality of acid monomers include those having a structure of

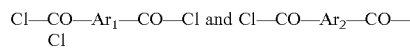

wherein $Ar_1$ is an aromatic group having para-oriented linkages and $Ar_2$ is an aromatic group having meta-oriented linkages, and wherein the plurality of acid monomers has at least 50 mole percent of the monomer containing aromatic group $Ar_2$; and
    the second polymer having a structure derived from the reaction of metaphenylene diamine and isophthaloyl chloride wherein no more than 10 percent of other diamines are substituted for metaphenylene diamine.

9. The fibrid of claim 8, wherein the one or more amine monomers is 100 mole percent 5(6)-amino-2-(p-aminophenyl) benzimidazole.

10. The fibrid of claim 9, wherein the one or more amine monomers include metaphenylene diamine.

11. The fibrid of any one of claims 8 to 10, wherein the mixture of first polymer and second polymer contains 25 to 80 weight percent of the first polymer, based on the total amount of first polymer and second polymer.

12. The fibrid of claim 11, wherein the mixture of first polymer and second polymer contains 25 to 50 weight percent of the first polymer, based on the total amount of first polymer and second polymer.

* * * * *